US006984711B2

(12) United States Patent
Wonmun et al.

(10) Patent No.: US 6,984,711 B2
(45) Date of Patent: Jan. 10, 2006

(54) METHOD FOR PRODUCTION OF CYCLIC POLYSULFIDE COMPOUND AND RUBBER COMPOSITION CONTAINING THE SAME

(75) Inventors: Choi Wonmun, Hiratsuka (JP); Kazunori Ishikawa, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 601 days.

(21) Appl. No.: 09/993,759

(22) Filed: Nov. 27, 2001

(65) Prior Publication Data

US 2002/0107338 A1 Aug. 8, 2002

(30) Foreign Application Priority Data

Dec. 8, 2000 (JP) ............................ 2000-374924
Jan. 25, 2001 (JP) ............................ 2001-017579

(51) Int. Cl.
*C08L 75/14* (2006.01)
*C08L 9/00* (2006.01)

(52) U.S. Cl. ...................................... 528/189; 525/189

(58) Field of Classification Search ................ 528/388; 525/189

See application file for complete search history.

(56) References Cited

U.S. PATENT DOCUMENTS 6,518,367 B1 * 2/2003 Yatsuyanagi et al. .... 525/332.6

OTHER PUBLICATIONS

CAPLUS accession No. 1972:35343, Japanese Patent No. 46-27543 B4, Sekisui Chemical Co. Ltd., Aug. 10, 1971.*

CAPLUS accession No. 1952:70623, Cranker et al., “Use of polysulfide liquid polymers for impregnation of leather,” Journal of the American Leather Chemists Association, vol. 47, 1952, abstract.*

CAPLUS accession No. 1966:491046, Hayashi et al., “Molecular vibrations and structures of polyalkylene polysulfides. II. Poly(ethylene disulfide),” Bulletin of the Chemical Society of Japan, vol. 39, No. 9, 1966, abstract.*

CAPLUS accession No. 1972:527101, Golgotiu et al., “Acquiring polymers with S-S- linkage in the principle chain,” Bulentinul Institutului Politehnic din lasi, vol. 18, Nos. 1-2, 1972, abstract.*

CAPLUS accession No. 1972:527651, Romanova et al., “Kinetics of the interaction of bis(.beta.-chloroethyl)formal with sodium polysulfide,” Izvestiya Vysshikh Uchebnykh Zavadenii, Khimiya i Khimicheskaya Tekhnologiya, vol. 15, No. 6, 1972, abstrac.*

CAPLUS accession No. 1982:424281, Rafikov et al., “Reactions of dihalo derivatives with inorganic sulfides,” Izvestiya Akadem Nauk USSR, Seriya Khimicheskaya, vol. 4, 1982, abstract.*

CAPLUS accession No. 1988:474395, Nasonova et al., “Structural features of a high-molecular-weight polysulfide polymer,” Kauchuk i Rezina, vol. 4, 1988, abstract.*

CAPLUS accession No. 1998:224337, Akiyama et al., “Synthesis of polydisulfide and control of it’s molecular weight,” Polymer Preprints, vol. 39, No. 1, 1998, abstract.*

* cited by examiner

*Primary Examiner*—Robert Sellers
(74) *Attorney, Agent, or Firm*—Rader, Fishman & Grauer PLLC

(57) ABSTRACT

A method of production of a cyclic polysulfide having the formula (I):

(I)

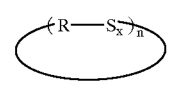

wherein x is an integer of 2 to 6, n is an integer of 1 to 15, and R indicates a substituted or unsubstituted $C_2$ to $C_{18}$ alkylene group or a substituted or unsubstituted $C_2$ to $C_{18}$ alkylene group including an oxyalkylene group comprising:

reacting a dihalogen compound of the formula X—R—X wherein, X independently indicates a halogen atom, and R indicates a substituted or unsubstituted $C_2$ to $C_{18}$ alkylene group or a substituted or unsubstituted $C_2$ to $C_{18}$ alkylene group including an oxyalkylene group and an alkali metal polysulfide of the formula $M_2S_x$ wherein, M is an alkali metal and x is an integer of 2 to 6, by a two-phase system in an incompatible mixed solvent of a hydrophilic and lypophilic solvent.

2 Claims, 1 Drawing Sheet

METHOD FOR PRODUCTION OF CYCLIC POLYSULFIDE COMPOUND AND RUBBER COMPOSITION CONTAINING THE SAME

BACKGROUND OF THE INVENTION

1. Field of the Invention

The present invention relates to a cyclic polysulfide compound and a method of production thereof as well as a rubber vulcanization agent comprises the same and a rubber composition containing the same.

2. Description of the Related Art

A cross-linked rubber sulfur vulcanized with sulfur has polysulfide bonds, and therefore, is inferior in heat resistance and vulcanization reversion. To solve the problems of heat resistance and vulcanization reversion, it is known that a vulcanization agent such as tetrasulfide polymer or cyclic polysulfide is effective (Noboru Yamazaki et al.: Abstracts of 1981 Research Announcement Conference, p. 53, 2–17, Japanese Rubber Industry Association and Japanese Unexamined Patent Publication (Kokai) No. 10-120788). In particular, a cyclic polysulfide is preferable in terms of the cross-linking efficiency, but the methods of production of a cyclic polysulfide reported up to now are not practical due to problems such as the long production process or use of expensive materials (Japanese Unexamined Patent Publication (Kokai) No. 58-122944).

Japanese Unexamined Patent Publication (Kokai) No. 58-122944 reports the following method of production of a cyclic polysulfide compound:

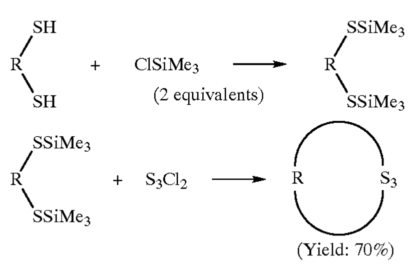

$R = \text{—}(CH_2CH_2O)_n\text{—}CHCH_2\text{—}$, (n = 2 - 5)

According to this production method, it is necessary to react an expensive material, i.e., dithiol, and 2 equivalents of an expensive chlorotrimethylsilane as a protecting group of dithiol. Chlorotrimethylsilane and the S—SiMe$_3$ group are easily hydrolyzed by moisture, and therefore, as a reaction condition, it is necessary to dry or treat the reaction apparatus so as to remove the humidity or moisture. Further, it is necessary to separately synthesize $S_3Cl_2$. Furthermore, the yield is 70% or lower, and therefore, there is a problem in the purification of the desired product.

SUMMARY OF THE INVENTION

Accordingly, an object of the present invention is to provide an inexpensive simple production of a cyclic polysulfide compound useful as a rubber vulcanization agent from a dihalogen compound and a metal polysulfide.

In accordance with the present invention, there is provided a method for producing a cyclic polysulfide having the formula (I):

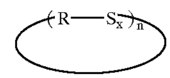

(I)

wherein x is an integer of 2 to 6, n is an integer of 1 to 15, and R indicates a substituted or unsubstituted $C_2$–$C_{18}$ alkylene group or a substituted or unsubstituted $C_2$ to $C_{18}$ alkylene group including an oxiyalkylene group comprising:

reacting a dihalogen compound having the formula X—R—X, wherein X independently indicates a halogen atom, and R indicates a substituted or unsubstituted $C_2$ to $C_{18}$ alkylene group or a substituted or unsubstituted $C_2$ to $C_{18}$ alkylene group including an oxyalkylene group and an alkali metal polysulfide have the formula $M_2S_x$, wherein M is an alkali metal and x is an integer of 2 to 6, in an incompatible mixed solvent of a hydrophilic and lypophilic solvent, by a two-phase system.

In accordance with the present invention, there is also provided a method for producing a cyclic polysulfide having the above formula (I) comprising: reacting by adding a dihalogen compound having the formula X—R—X, wherein X independently indicates, a halogen atom and R indicates a substituted or unsubstituted $C_2$ to $C_{18}$ alkylene group or a substituted or unsubstituted $C_2$ to $C_{18}$ alkylene group including an oxyalkylene group with a solution of an alkali metal polysulfide having the formula $M_2S_x$, wherein, M is an alkali metal and x is an integer of 2 to 6, by adding the dihalogen compound at a rate such that the dihalogen compound reacts with the alkali metal polysulfide at the interface thereof.

In accordance with the present invention, there is further provided a cyclic polysulfide wherein, in formula (I), R is $\text{—}(CH_2)_m\text{—}$, $\text{—}CH_2CH_2OCH_2OCH_2CH_2\text{—}$, or $\text{—}CH_2CH_2OCH_2CH_2\text{—}$, x is an integer of 2 to 6, and n is an integer of 1 to 15.

In accordance with the present invention, there is still further provided a rubber vulcanization agent comprised of said cyclic polysulfide.

In accordance with the present invention, there is still further provided a rubber composition comprising 100 parts by weight of a diene-based rubber and 0.5 to 30 parts by weight, preferably 0.5 to 20 parts by weight, of the rubber vulcanization agent.

In this specification and in the claims which follow, the singular forms "a," "an" and "the" include plural referents unless context clearly dictates otherwise.

BRIEF DESCRIPTION OF THE DRAWINGS

The present invention will be better understood from the description set forth below with reference to the accompanying drawing, in which.

DESCRIPTION OF THE PREFERRED EMBODIMENTS

Figure 1:
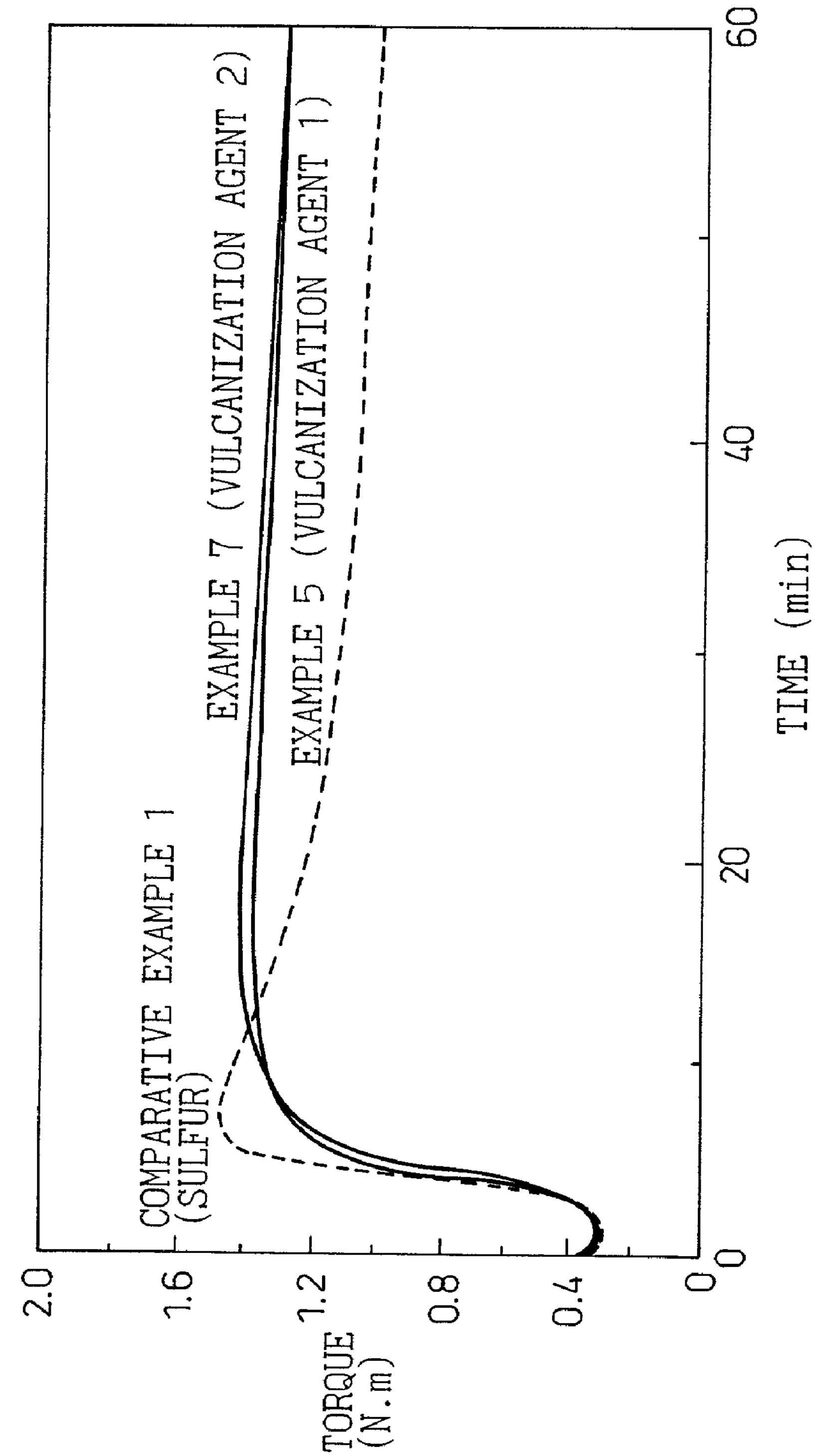
FIG. 1 is a graph of the test results of a rheometer (160° C.×60 minutes) of Comparative Example 1 and Examples 5 and 7.

According to the present invention, the cyclic polysulfide having the above-mentioned formula (I) is produced by reacting a dihalogen compound having the formula X—R—X, wherein X independently represents a halogen atom including fluorine, chlorine, bromine and iodine, preferably chlorine and bromine, and R represents a substituted or unsubstituted $C_2$ to $C_{18}$ alkylene group or a substituted or unsubstituted $C_2$ to $C_{18}$ alkylene group including an oxyalkylene group with an alkali metal polysulfide $M_2S_x$, wherein M is an alkali metal, for example, sodium, potassium and lithium and x is an integer of 2 to 6, in an incompatible mixed solvent of a hydrophilic and lypophilic solvent by a two-phase system or reacting them by adding X—R—X in a solution of $M_2S_x$, in which, as the solvent, it is possible to use water and a $C_1$ to $C_4$ aliphatic alcohol, preferably water, at a rate such that $M_2S_x$ and X—R—X react at the interface thereof. Note that, in the latter method, if the addition rate of the X—R—X is too fast, the concentration of X—R—X becomes higher, a reaction occurs outside the interface, and a reaction between the molecules is preferably occurs to form a chain, which is not desirable. Therefore, it is preferable for obtaining a cyclic polysulfide that the $M_2S_x$ and X—M—X are reacted in as a nonuniform or heterogeneous system as possible only at the interface.

As the group R of the formula X—R—X and the formula (I), for example, a straight or branched chain alkylene group such as ethylene, propylene, butylene, pentylene, hexylene, octylene, nonylene, decylene, and 1,2-propylene may be exemplified. These alkylene groups may be substituted with a substituent group such as a phenyl group or benzyl group. The group R may further include an alkylene group including an oxyalkylene group. Examples of such a group are an alkylene group including an oxyalkylene group with the group $(CH_2CH_2O)_p$ and the group $(CH_2)_q$, wherein p is an integer of 1 to 5 and q is an integer of 0 to 2, bonded in any way. Preferable groups R include:

—$CH_2CH_2OCH_2CH_2$—, —$(CH_2CH_2O)_2CH_2CH_2$—, —$(CH_2CH_2O)_2CH_2$—$CH_2$—, —$(CH_2CH_2O)_4CH_2CH_2$—, —$(CH_2CH_2O)_5CH_2CH_2$—, —$(CH_2CH_2O)_2CH_2$—, $CH_2CH_2OCH_2OCH_2CH_2$—

In particular, x is preferably an average of 3.0 to 5.0, more preferably 3.5 to 4.5. n is preferably 1 to 10, more preferably 1 to 5.

The reaction between the dihalogen compound and the alkali metal polysulfide is an equivalent amount reaction. In practice, the two compounds are reacted in a ratio by equivalents of 0.95:1.0 to 1.0:0.95, preferably at a temperature of 50 to 120° C., more preferably 70 to 100° C.

The hydrophilic solvents and lypophilic solvents usable in the present invention are not particularly limited. In an actual reaction system, it is possible to use any solvents which are incompatible with each other and to form two phases. Specifically, as a hydrophilic solvent, in addition to water, alcohols such as methanol, ethanol, ethylenglycol, diethylene glycol may be exemplified. These solvents may also be used in any mixtures. Further, as the lyophilic solvent, an aromatic hydrocarbon such as toluene, xylene, and benzene, an aliphatic hydrocarbon such as pentane and hexane, an ether such as dioxane and dibutylether, an ester such as ethyl acetate, etc. may be exemplified. These solvents may also be used in any mixtures.

The reaction at the interface of the dihalogen compound and the alkali metal polysulfide is an equivalent amount reaction. In practice, the two compounds are reacted in an equivalent ratio of 0.95:1 to 1:0.95. The reaction temperature is preferably 50 to 120° C., more preferably 70 to 100° C.

In the above reaction, no catalyst is required, but sometimes it is possible to use, for example, a quaternary ammonium salt, phosphonium salt, crown ether, etc. as a catalyst. For example, $(CH_3)_4N^+Cl^-$, $(CH_3)_4N^+Br^-$, $(C_4H_9)_4N^+Cl^-$, $(C_4H_9)_4N^+Br^-$, $C_{12}H_{25}N^+(CH_3)_3Br^-$,$(C_4H_9)_4P^+Br^-$, $CH_3P^+(C_6H_5)_3I^-$, $C_{16}H_{33}P^+(C_4H_9)_3Br^-$, 15-crown-5,18-crown-6, Benzo-18-crown-6, etc. may be exemplified.

The rubber composition according to the present invention is comprised of 0.5 to 30 parts by weight, preferably 0.5 to 20 parts by weight, of a rubber vulcanization agent having the above formula (I), blended into 100 parts by weight of a diene-based rubber. The rubber vulcanization agent of the present invention can be used, together with a conventional sulfur or other vulcanization agent. If the amount of the rubber vulcanization agent of the present invention is too small, a desired vulcanization effect cannot be sufficiently obtained and the strength of the vulcanized rubber etc. are decreased and therefore, this is not preferable, while if it is too large, the vulcanized rubber impreferably becomes hard.

The diene-based rubber blended into the rubber composition according to the present invention includes, for example, any diene-based rubber which can be used as a starting rubber for tires. Typical examples of such diene-based rubbers are natural rubber (NR), polyisoprene rubber (IR), various types of polybutadiene rubber (BR), various types of styrene-butadiene copolymer rubber (SBR), ethylene-propylene-diene terpolymer rubber (EPDM). These rubbers may be used alone or in any blends thereof.

The rubber composition according to the present invention may contain, in addition to the above-mentioned essential ingredients, a filler such as carbon black or silica, a vulcanization accelerator, various oils, antioxidants, plasticizers, silane coupling agent, or other various additives generally blended for tire or other general rubber use. The formulation may be mixed into a composition by a general method and used for vulcanization. The amount of these additives blended may be made the general amounts blended in the past unless the object of the present invention is not impaired.

EXAMPLES

The present invention will now be explained further by using Examples, but the scope of the present invention is of course not limited to these Examples.

Example 1

28.1 g (0.15 mole) of 1,2-bis(2-chloroethoxy)ethane and 89.76 g (0.155 mole) of an aqueous 30% by weight sodium polysulfide ($Na_2S_4$) solution were reacted in an incompatible mixed solvent of 150 g of water and 100 g of toluene at 90° C. for 5 hours. After the end of the reaction, the organic phase was separated and condensed in vacuo at 90° C. to obtain 34.3 g (yield 94%) of a cyclic polysulfide (i.e., vulcanization agent 1) of the formula (I) wherein R=$(CH_2)_2O(CH_2)_2O(CH_2)_2$, x (average)=4, and n=1 to 5. The number average molecular weight of the cyclic polysulfide thus obtained was 500 and the NMR data was as follows:

$^1$H-NMR (chloroform-$d_1$) δ: 2.9 to 3.2 (4H, $CH_2S_x$), 3.7 to 4.0 (8H, $CH_2O$)

Example 2

A solution of 28.1 g (0.15 mole) of 1,2-bis(2-chloroethoxy)ethane dissolved in 30 g of toluene was dropwise added to a mixed solvent of 89.76 g (0.155 mole) of an aqueous 30% by weight sodium polysulfide ($Na_2S_4$) solution, 150 g of ethanol, and 100 g of toluene at 90° C. for 2 hours and the mixture allowed to react for a further 3 hours.

After the end of the reaction, the organic phase was separated and condensed in vacuo at 90° C. to obtain 35.0 g (yield 96%) of a cyclic polysulfide of the formula (I), wherein $R=(CH_2)_2O(CH_2)_2O(CH_2)_2$, x (average)=4, and n=1 to 2. The number average molecular weight of the cyclic polysulfide thus obtained was 300 and the NMR data was as follows:

$^1$H-NMR (chloroform-$d_1$) δ: 2.9 to 3.2 (4H, $CH_2S_x$), 3.7 to 4.0 (8H, $CH_2O$)

Example 3

23.3 g (0.15 mole) of 1,6-dichlorohexane and 89.76 g (0.155 mole) of an aqueous 30% by weight sodium polysulfide ($Na_2S_4$) solution were allowed to react in a mixed solvent of 120 g of ethanol and 100 g of toluene at 90° C. for 5 hours. After the end of the reaction, the organic phase was separated and condensed in vacuo at 90° C. to obtain 31.2 g (yield: 98%) of a cyclic polysulfide of the formula (I) wherein $R=(CH_2)_6$, x (mean)=4, and n=1 to 5. The number average molecular weight of the cyclic polysulfide thus obtained was 500 and the NMR data was as follows:

$^1$H-NMR (chloroform-$d_1$) δ: 1.4 to 1.9 (4H, $CH_2S_x$), 3.7 to 4.0 (8H, $CH_2$)

Example 4

89.8 g (0.15 mole) of an aqueous 30% by weight sodium polysulfide ($Na_2S_4$) solution was diluted by adding 100 g of water, then 25.9 g (0.15 mole) of 1,2-bis(2-chloroethoxy) methane was dropwise added thereto at 90° C. over 2 hours and the mixture was allowed to further react at that temperature for 3 hours. After the end of the reaction, the water insolubles were washed with water, then dried in vacuo at 100° C. for 2 hours to obtain 33.2 g (yield: 96%) of cyclic polysulfide (i.e., vulcanization agent 3) of the formula (I), wherein $R=—CH_2CH_2OCH_2OCH_2CH_2—$, x(average)=4, and n=1 to 5. The number average molecular weight of the cyclic polysulfide thus obtained was 600 and the NMR data was as follows:

$^1$H-NMR (chloroform-$d_1$) δ: 2.9 to 3.3 (4H, $CH_2S$), 3.7 to 4.0 (4H, $CH_2O$), 4.8 (2H, $OCH_2O$)

Examples 5 to 8 and Comparative Example 1

The following tests were carried out for evaluating the blended physical properties of the rubber vulcanization agent of the present invention.

The formulations of the rubber (parts by weight) are as shown in Table I.

TABLE I

| | Comp. Ex. 1 | Ex. 5 | Ex. 6 | Ex. 7 | Ex. 8 |
|---|---|---|---|---|---|
| Polyisoprene rubber*1 | 100 | 100 | 100 | 100 | 100 |
| Carbon black*2 | 50 | 50 | 50 | 50 | 50 |
| Zinc oxide | 3 | 3 | 3 | 3 | 3 |
| Stearic acid | 1 | 1 | 1 | 1 | 1 |
| Antioxidant*3 | 1 | 1 | 1 | 1 | 1 |
| NS*4 | 0.8 | 0.8 | 0.8 | 0.8 | 0.8 |
| Sulfur*5 | 1.5 | 0 | 0.75 | 0 | 0 |
| Vulcanization agent 1*6 | — | 3 | 1.5 | — | — |
| Vulcanization agent 2*7 | — | — | — | 3 | — |
| Vulcanization agent 3*8 | — | — | — | — | 3 |

*1 Nipole IR 2200 (available from Nippon Zeon)
*2 Seast KH (available from Tokai Carbon)
*3 Santoflex 6PPD (available from Flexis)
*4 (N-t-butyl-2-benzothiazolylsulfenamide)
*5 Insoluble sulfur (available from Akzo Kashima)
*6 Vulcanization agent produced by Example 1
*7 Vulcanization agent produced by Example 3
*8 Vulcanization agent produced by Example 4

The rubber composition of the formulation (parts by weight) shown in Table I was mixed by an 8-inch open roll, then the rubber was vulcanized under vulcanization conditions of 160° C. and 20 minutes. The results are shown in Table II. As is clear from the results shown in Table II, compared with the rubber composition of Comparative Example 1, the rubber compositions of Examples 4 to 6 according to the present invention are observed to exhibit excellent rates of retention of the breaking strength (TB) and elongation at break (EB) and to be superior in heat stability even after accelerated thermal ageing at 100° C.×3 days.

TABLE II

| | Comp. Ex. 1 | Ex. 5 | Ex. 6 | Ex. 7 | Ex. 8 |
|---|---|---|---|---|---|
| Before thermal ageing | | | | | |
| 100% modulus (MPa) | 2.76 | 3.0 | 3.42 | 3.13 | 3.09 |
| 300% modulus (MPa) | 12.72 | 13.68 | 14.85 | 13.69 | 13.65 |
| TB | 30.17 | 33.43 | 32.66 | 32.24 | 33.21 |
| EB (%) | 556.2 | 566.8 | 545.5 | 556.2 | 565.3 |
| After thermal ageing | | | | | |
| 100% modulus (MPa) | 4.15 | 4.36 | — | — | 4.07 |
| 300% modulus (MPa) | 17.2 | 17.49 | — | — | 16.86 |
| TB | 20.0 | 24.27 | — | — | 25.82 |
| EB (%) | 332.1 | 395.1 | — | — | 407.5 |

Example 9

Rheometer of Example 5 and 7 (160° C., 60 Minutes)

Test Method

100% and 300% modulus: Measured according to JIS K6251 (dumbbell shape no. 3)

Breaking strength (TB) and elongation at break (EB): Measured according to JIS K6251 (dumbbell shape no. 3)

The rubber compositions of Comparative Example 1 (i.e., sulfur vulcanization), Example 5 (i.e., vulcanization by vulcanization agent 1), and Example 7 (i.e., vulcanization by vulcanization agent 2) were tested at 160° C. for 60 minutes using a rheometer (i.e., vulcanization tester). The results are shown in FIG. 1 as a curve of the change of the torque over time. From the results of FIG. 1, no vulcanization reversion was recognized in Examples 5 and 7 using the rubber vulcanization agents according to the present invention. The existing vulcanization state was exhibited.

According to the present invention, as explained above, by reacting a dihalogen compound and an alkali metal polysulfide in an incompatible mixed solvent of a hydrophilic and lypophilic solvent by a two-phase system, it is possible to inexpensively and simply produce a cyclic polysulfide. Further, when the cyclic polysulfide of the present invention is used as a rubber vulcanization agent, it is possible to give an optimal vulcanization state without causing the vulcanization reversion or improve the heat stability of the vulcanized rubber compared with an ordinary sulfur vulcanization system.

What is claimed is:

1. A method for producing a cyclic polysulfide having the formula (I):

(I)

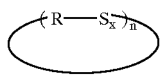

wherein x is an integer of 2 to 6, n is an integer of 1 to 15, and R indicates a substituted or unsubstituted $C_2$ to $C_{18}$ alkylene group or a substituted or unsubstituted $C_2$ to $C_{18}$ alkylene group containing an oxyalkylene group comprising:

reacting a dihalogen compound having the formula X—R—X, wherein X independently indicates a halogen atom, and R indicates a substituted or unsubstituted $C_2$ to $C_{18}$ alkylene group or a substituted or unsubstituted $C_2$ to $C_{18}$ alkylene group containing an oxyalkylene group and an alkali metal polysulfide having the formula $M_2S_x$, wherein M indicates an alkali metal and x is an integer of 2 to 6 by a two-phase system in a incompatible mixed solvent of a hydrophilic and lypophilic solvent.

2. A method for producing a cyclic polysulfide as claimed in claim 1, wherein comprising performing the reaction between the dihalogen compound and the alkali metal polysulfide in an incompatible mixed solvent system of 10 to 2000 parts by weight of hydrophilic and lypophilic solvents, respectively, based upon 100 parts by weight of the dihalogen compound at a temperature of 50 to 120° C.

* * * * *